United States Patent
Shimizu et al.

(10) Patent No.: US 8,671,751 B2
(45) Date of Patent: Mar. 18, 2014

(54) LIQUID LEVEL DETECTING APPARATUS

(75) Inventors: Takafumi Shimizu, Shimada (JP); Toshio Oike, Shimada (JP); Kenichi Tanaka, Shimada (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 13/355,816

(22) Filed: Jan. 23, 2012

(65) Prior Publication Data

US 2012/0186340 A1 Jul. 26, 2012

(30) Foreign Application Priority Data

Jan. 24, 2011 (JP) ................................. 2011-012180
Apr. 21, 2011 (JP) ................................. 2011-095301

(51) Int. Cl.
*G01F 23/32* (2006.01)
*G01F 23/00* (2006.01)

(52) U.S. Cl.
USPC .......................................... 73/317; 73/290 R

(58) Field of Classification Search
USPC .......... 73/290 R, 290 B, 318, 320, 305–322.5
See application file for complete search history.

(56) References Cited

U.S. PATENT DOCUMENTS

| | | | | |
|---|---|---|---|---|
| 6,142,018 | A * | 11/2000 | Dedert et al. ................ | 73/305 |
| 6,389,892 | B1 * | 5/2002 | Sato et al. ................ | 73/304 R |
| 6,985,068 | B2 | 1/2006 | Dedert et al. | |
| 7,111,510 | B2 * | 9/2006 | Tadoa et al. ................ | 73/304 R |
| 2005/0040930 | A1 * | 2/2005 | Dedert et al. ................ | 338/160 |
| 2010/0139394 | A1 | 6/2010 | Pauer et al. | |
| 2010/0223993 | A1 * | 9/2010 | Shimizu et al. ................ | 73/317 |

FOREIGN PATENT DOCUMENTS

| | | |
|---|---|---|
| CN | 101657703 A | 2/2010 |
| JP | 2003287456 A | 10/2003 |
| JP | 2009162694 A | 7/2009 |

OTHER PUBLICATIONS

Office Action dated Dec. 5, 2013 issued by the State Intellectual Property Office of the People's Republic of China in counterpart Chinese Patent Application No. 201210021571.4.

* cited by examiner

*Primary Examiner* — Daniel S Larkin
*Assistant Examiner* — Jamar Ray
(74) *Attorney, Agent, or Firm* — Sughrue Mion, PLLC

(57) ABSTRACT

A liquid level detecting apparatus is provided. A resistance plate has a plurality of elongated conductive segments arranged therein. A float is configured to be moved upward and downward depending on a displacement of a liquid level to be measured. A floating arm has one end attached to the float and the other end rotatably supported to be rotated in response to upward and downward movements of the float. A contact is configured to be slid on the plurality of conductive segments in association with a rotation of the float arm depending on the liquid level. The plurality of conductive segments comprise a plurality of first segments made of a first metal material containing at least silver (Ag) and palladium (Pd), and a plurality of second segments made of a second metal material essentially containing gold (Au).

5 Claims, 5 Drawing Sheets

LIQUID LEVEL DETECTING APPARATUS

The disclosure of Japanese Patent Application No. 2011-012180 filed on Jan. 24, 2011 and Japanese Patent Application No. 2011-095301 filed on Apr. 21, 2011, including specifications, drawings and claims is incorporated herein by reference in its entirety.

BACKGROUND

The invention relates to a liquid level detecting apparatus, and more particularly to a liquid level detecting apparatus for automatically detecting a residual amount of a liquid stored in a fuel tank for transport means, such as automobiles and airplanes, by detecting a liquid level thereof.

There are previously known a liquid level detecting apparatus for detecting a liquid level in a fuel tank, for example, of automobiles, in which a float moves upward and downward depending on the liquid level such that a floating arm is slid on a resistance plate, and thus the liquid level is converted into an electrical potential difference, thereby detecting the liquid level.

Herein, an example of the liquid level detecting apparatus will be described. FIG. 1 is an electric block diagram illustrating a configuration of a sensor used in the liquid level detecting apparatus according to the invention and the related art. FIG. 2 is a diagram illustrating a configuration of the liquid level detecting apparatus according to the invention and the related art. FIG. 3 is a diagram illustrating a configuration of a variable resistor in the sensor according to the invention and the related art.

The sensor 2 of the liquid level detecting apparatus 1 includes a variable resistor 3 which changes a resistance value by allowing contacts 19 and 20, as described below, to move in association with a change in liquid level within a hermetically sealed vessel inside T. The variable resistor 3 is connected in series to a fixed resistor 7, and in turn connected to a power supply circuit 4, which applies a predetermined voltage to the variable resistor 3 and the fixed resistor 7

The sensor 2, as shown FIGS. 2 and 3, includes a resistance plate 13 attached to a body frame 12, and a sliding contact element 14 connected to a proximal end of a floating arm 11, which has also a distal end attached to a float 10 configured to float on a surface of a liquid by buoyancy relative to the liquid. The resistance plate 13 of the sensor 2 is provided with a first conductive pattern 15 and a second conductive pattern 16. These first and second conductive patterns 15 and 16 are arranged in parallel to each other in an arc-like shape about a rotational axis 21 of the floating arm 11. An input/output conductive portion 17 is connected to one end of the first conductive pattern 15, and an input/output conductive portion 18 is connected to one end of the second conductive pattern 16.

The first conductive pattern 15 consists of a plurality of elongated conductive segments 15a arranged in a circumferential direction of the arc-like shape at a predetermined interval and a resistance element 15b electrically connecting the conductive segments 15a to each other. Also, the second conductive pattern 16 consists of a plurality of elongated conductive segments 16a arranged in a circumferential direction of the arc-like shape at a predetermined interval and a connecting element 16b electrically connecting the conductive segments 16a to each other.

The sliding contact element 14 is provided with the contacts 19 and 20 electrically connected to each other. Also, the rotational axis 21 located on the proximal end of the floating arm 11 is connected to the sliding contact element 14. The floating arm 11 pivots about the rotational axis 21 as a supporting point in a arrow Y direction in FIG. 3 by allowing the float 10, which floats on the surface of the liquid, to downwardly move according to an amount of the liquid consumed from a liquid level in full tank condition. In response to such a pivoting of the floating arm 11, the sliding contact element 14 also rotates in the arrow Y direction in FIG. 3. By such a rotation of the sliding contact element 14, each of the contacts 19 and 20 slide on and contact electrically with each of the conductive segments 15a and 16a respectively disposed on the first conductive pattern 15 and the second conductive pattern 16. As a result, a length of the resistance element 15b interposed in a circuit between the input/output conductive portion 17 connected to the first conductive pattern 15 and the input/output conductive portion 18 connected to the second conductive pattern 16 is changed, and thus a resistance value of the circuit is changed (i.e., the resistance value of the variable resistor 3 in FIG. 1 is changed). As described above, the variable resistor 3 consists of the first conductive pattern 15, the second conductive pattern 16, and the sliding contact element 14.

An electrical potential difference between the input/output conductive portions 17 and 18 caused when a voltage is applied to the variable resistor 3 is detected by the sensor 2, and an output signal of the sensor 2 is sent to a processing circuit 5. Then, the processing circuit 5 displays a residual amount of the liquid based on the output signal of the sensor 2 on an indication device, such as a gauge 6, in an analogue or bar graph manner. Meanwhile, a fixed resistor may be disposed in the gauge 6 on a wire for connecting the gauge 6 to the processing circuit 5.

In such a liquid level detecting apparatus, silver-palladium (AgPd) alloy, silver-copper (AgCu) alloy, silver-nickel (AgNi) alloy, and the like are generally used as the material of the contacts. The conductive segments are made of a mixture of silver-palladium (AgPd) powder and glass, for example, and are manufactured by mixing silver powder, palladium powder, and glass powder to form a paste, printing the obtained paste on the resistance plate, drying, and then sintering.

However, the liquid level detecting apparatus can be used in a fuel tank of an automobile using as a fuel an electrolyte (alcohol) itself, such as ethanol and methanol, or gasoline containing such an electrolyte. Silver (Ag) has a lower electrical resistance and an excellent conductivity, but the contacts and the conductive segments containing such silver can be deteriorated or eroded by a sulfur component, water, an alcohol component and the like in the fuel, thereby causing an impediment in which measuring cannot be performed or an incorrect value can be created, etc., due to a poor electrical conduction. Also, due to a present world fuel situation, a possibility of using various mixed fuels is being increased, and thus, it is necessary to provide a reliable fuel system which can prevent such an impediment. Therefore, to prevent the deterioration and erosion of the conductive segments and the contacts, there are known technologies in which portions of the conductive segments, on which the contacts are slid, are coated with an alloy containing gold (Au)(e.g., see Patent Documents 1 and 2).

Patent Document 1: JP-A-2003-287456
Patent Document 2: JP-A-2009-162694

The technologies according to the Patent Documents 1 and 2 has an effect to deterioration and erosion resistances of the conductive segments, but tend not to provide an sufficient effectiveness of the effect because the coated layer can be thinned over time. In addition, to obtain a sufficient deterioration and erosion resistances, it is necessary to contain a large amount of gold (e.g., approximately 40% mass or more in case of the conductive segments), thereby causing a problem of increasing costs.

SUMMARY

It is therefore an object of the present invention to provide a liquid level detecting apparatus in which, even when used in the presence of a sulfur component, such as gasoline, as well as in a normal environment, the deterioration and erosion resistances can be obtained, and manufacturing costs thereof can be inhibited.

That is to say, the object of the invention is achieved by the following (1) to (6).

(1) A liquid level detecting apparatus, comprising: a resistance plate having a plurality of elongated conductive segments arranged therein; a float configured to be moved upward and downward depending on a displacement of a liquid level to be measured; a floating arm having one end attached to the float and the other end rotatably supported to be rotated in response to upward and downward movements of the float; and a contact configured to be slid on the plurality of conductive segments in association with a rotation of the float arm depending on the liquid level, wherein the plurality of conductive segments comprise a plurality of first segments made of a first metal material containing at least silver (Ag) and palladium (Pd), and a plurality of second segments made of a second metal material essentially containing gold (Au).

(2) The liquid level detecting apparatus according to (1), wherein a first segment group comprising at least one first segment and a second segment group comprising at least one second segment are alternatively arranged to each other.

(3) The liquid level detecting apparatus according to (1) or (2), wherein the first segments include base portions contacted to the resistance plate, and top portions respectively stacked over the base portions, and wherein the base portions are made of the first metal material, and the top portions are made of the second metal material.

(4) The liquid level detecting apparatus according to any one of (1) to (3), wherein the second metal material contains gold (Au) in a range of 95% by mass or more.

(5) The liquid level detecting apparatus according to any one of (1) to (4), wherein the second metal material contains a glass component.

(6) The liquid level detecting apparatus according to any one of (1) to (5), wherein the first metal material contains gold (Au).

According to the invention, the plurality of conductive segments constituting the resistance plate include a plurality of first segments made of a first metal material containing at least silver (Ag) and palladium (Pd), and a plurality of second segments made of a second metal material essentially containing gold (Au). Therefore, the liquid level detecting apparatus having sufficient deterioration and erosion resistances even when used in gasoline containing a large amount of a sulfur component or in a fuel having various components mixed therein can be provided. Specifically, the conductive segments and the contacts are subjected to a very small abrasion by sliding to each other, and thus the first metal material can be just dropped down, while gold (Au) separated by an abrasion of the second metal material is transferred to sliding surfaces. Namely, gold (Au) separated by an abrasion of the second segments is transferred to sliding surfaces of the first segments and the contacts. The transferring of gold (Au) is occurred between the conductive segments and the contacts. Because gold (Au) is transferred to the sliding surfaces, a sulfide deterioration by a sulfur component, an erosion, an oxidation, and the like can be prevented. Therefore, contact conductivity between the conductive segments and the contacts can be better remained, such that a contacting impediment can be prevented. Furthermore, gold (Au) is not necessary used for the whole of the conductive segments, thereby reducing an amount of gold used relative to that of the related art. Thus, material costs can be decreased, thereby decreasing the manufacturing costs of the liquid level detecting apparatus.

BRIEF DESCRIPTION OF THE DRAWINGS

In the accompanying drawings:

FIGS. 4A and 4B are diagrams illustrating a configuration of conductive segments according to a first embodiment of the liquid level detecting apparatus of the invention, wherein FIG. 4A is a partially enlarged view of the conductive segments, and FIG. 4B is a cross-sectional view taken along a line IVa-IVa in FIG. 4A; and FIGS. 5A and 5B are diagrams illustrating a configuration of conductive segments according to a second embodiment of the liquid level detecting apparatus of the invention, wherein FIG. 5A is a partially enlarged view of the conductive segments, and FIG. 5B is a cross-sectional view taken along a line Va-Va in FIG. 5A.

DETAILED DESCRIPTION OF THE EMBODIMENTS

Hereafter, embodiments of the invention will be described in detail. A basic structure of a liquid level detecting apparatus of the invention was described in detail in the related art section with reference to FIGS. 1, 2, and 3, but will be again described.

Figure 1:
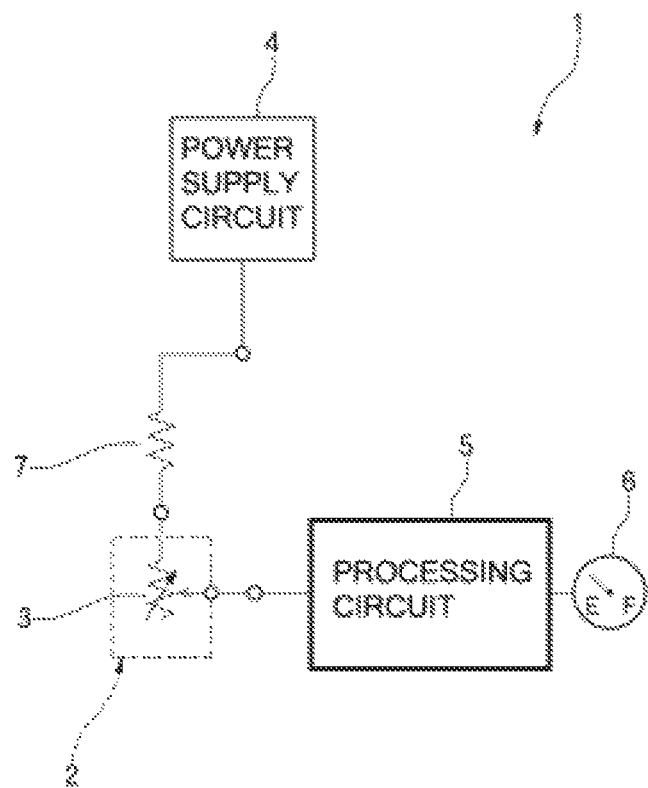
FIG. 1 is an electric block diagram illustrating a configuration of a sensor used in a liquid level detecting apparatus according to the invention and the related art.

As shown in FIG. 1, a sensor 2 of the liquid level detecting apparatus 1 includes a variable resistor 3 which changes a resistance value by allowing contacts 19 and 20, as described below, to move in association with a change in liquid level within a hermetically sealed vessel inside T. The variable resistor 3 is connected in series to a fixed resistor 7, and in turn connected to a power supply circuit 4, which applies a predetermined voltage to the variable resistor 3 and the fixed resistor 7.

Figure 2:
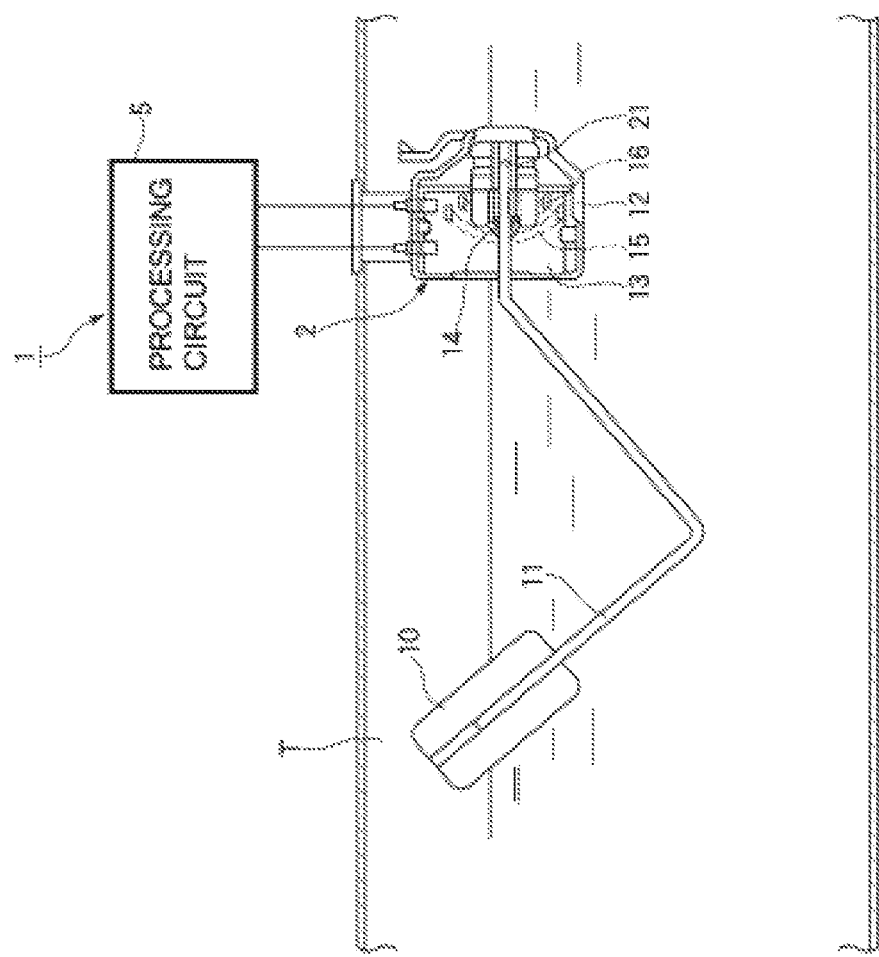
FIG. 2 is a diagram illustrating a configuration of the liquid level detecting apparatus according to the invention and the related art.
Figure 3:
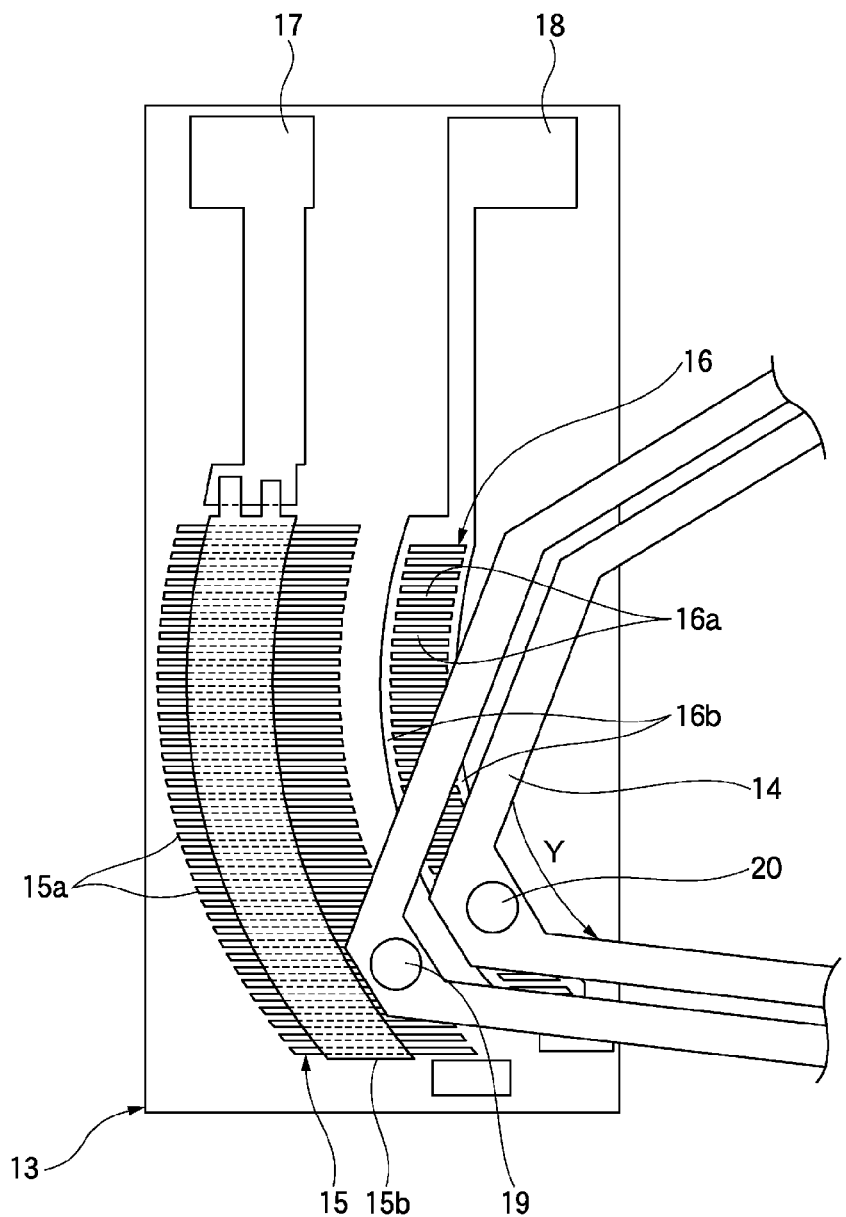
FIG. 3 is a diagram illustrating a configuration of a variable resistor in the sensor according to the invention and the related art.

The sensor 2, as shown FIGS. 2 and 3, includes a body frame 12, a resistance plate 13 attached to the body frame 12, and a sliding contact element 14. The sliding contact element 14 is connected to a proximal end of a floating arm 11, which has also a distal end attached to a float 10 configured to float on a surface of a liquid by buoyancy relative to the liquid. The resistance plate 13 of the sensor 2 is provided with a first conductive pattern 15 and a second conductive pattern 16. These first and second conductive patterns 15 and 16 are arranged in parallel to each other in an arc-like shape about a rotational axis 21 of the floating arm 11. An input/output conductive portion 17 is connected to one end of the first conductive pattern 15 on one side, and an input/output conductive portion 18 is connected to one end of the second conductive pattern 16 on other side.

The first conductive pattern 15 consists of a plurality of elongated conductive segments 15a arranged in a circumferential direction of the arc-like shape at a predetermined interval and a resistance element 15b electrically connecting the conductive segments 15a to each other. In addition, the second conductive pattern 16 consists of a plurality of elongated conductive segments 16a arranged in a circumferential direction of the arc-like shape at a predetermined interval and a connecting element 16b electrically connecting the conductive segments 16a to each other. The first conductive pattern 15 and the second conductive pattern 16 are spaced to each other.

The sliding contact element 14 has two frames concentrically arranged about the proximal end of the floating arm 11. These two frames are respectively provided with the contacts 19 and 20 electrically connected to each other. Also, the rotational axis 21 located on the proximal end of the floating arm 11 is connected to the sliding contact element 14.

The floating arm 11 pivots about the rotational axis 21 as a supporting point in a arrow Y direction in FIG. 3 by allowing the float 10, which floats on the surface of the liquid, to downwardly move according to an amount of the liquid consumed from a liquid level in full tank condition. In response to such a pivoting of the floating arm 11, the sliding contact element 14 also rotates in the arrow Y direction in FIG. 3. By such a rotation of the sliding contact element 14, the contact 19 slides on and contacts electrically with the conductive segments 15a disposed on the first conductive pattern 15, the contact 20 slides on and contacts electrically with the conductive segments 16a disposed on the second conductive pattern 16. As a result, a length of the resistance element 15b interposed in a circuit between the input/output conductive portion 17 connected to the first conductive pattern 15 and the input/output conductive portion 18 connected to the second conductive pattern 16 is changed, and thus a resistance value of the circuit is changed (i.e., the resistance value of the variable resistor 3 in FIG. 1 is changed). As described above, the variable resistor 3 consists of the first conductive pattern 15, the second conductive pattern 16, and the sliding contact element 14.

An electrical potential difference between the input/output conductive portions 17 and 18 caused when a voltage is applied to the variable resistor 3 is detected by the sensor 2, and an output signal of the sensor 2 is sent to a processing circuit 5. Then, the processing circuit 5 displays a residual amount of the liquid based on the output signal of the sensor 2 on an indication device, such as a gauge 6, in an analogue or bar graph manner. Meanwhile, a fixed resistor may be disposed in the gauge 6 on a wire for connecting the gauge 6 to the processing circuit 5.

According to the invention, the plurality of conductive segments 15a and 16a arranged as described above include a plurality of first segments made of a first metal material containing at least silver (Ag) and palladium (Pd), and a plurality of second segments made of a second metal material essentially containing gold (Au).

Figure 4A:
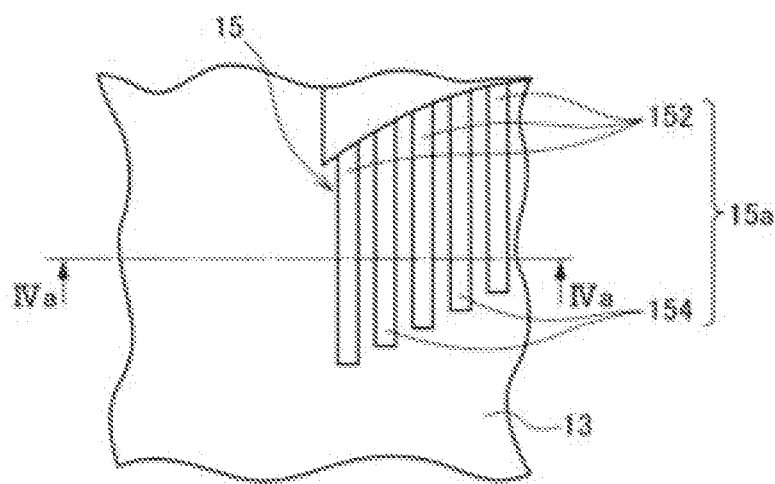
Figure 4B:
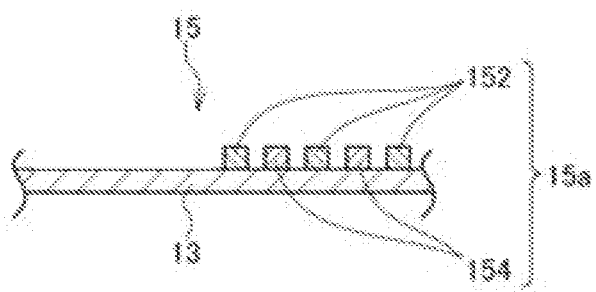

FIGS. 4A and 4B are diagrams illustrating a configuration of conductive segments according to a first embodiment of the liquid level detecting apparatus of the invention, wherein FIG. 4A is a partially enlarged view of the conductive segments, and FIG. 4B is a cross-sectional view taken along a line IVa-IVa in FIG. 4A.

According to the first embodiment of the invention, the plurality of conductive segments 15a forming the first conductive pattern 15 provided on the resistance plate 13 include a plurality of first segments 152 made of a first metal material containing at least silver (Ag) and palladium (Pd), and a plurality of second segments 154 made of a second metal material essentially containing gold (Au). As shown in FIGS. 4A and 4B, the first segments 152 and the second segments 154 are arranged generally in parallel and alternatively to each other, and form an arc-like shape as a whole (see FIG. 3).

When the first metal material contains at least silver (Ag) and palladium (Pd), a hardness of the first segments 152 can be increased to obtain a wear resistance, and can form a conductive pattern having an excellent conductivity.

According to the invention, gold (Au) may be added to the first metal material. By such an addition of gold (Au), the liquid level detecting apparatus having higher deterioration and erosion resistances against a fuel, such as gasoline, can be achieved.

Meanwhile, if the effects of the invention are not adversely affected, other metal materials may be added to the first metal material. The other metal materials includes, for example, cobalt (Co), nickel (Ni), ruthenium (Ru), copper (Cu), and platinum (Pt). The other metal materials may be used singly or as a combination of two or more metal materials.

The second metal material forming the second segments 154 essentially contains gold (Au). Gold (Au) is preferably contained in a range of 95% by mass or more, and more preferably in range of 98% by mass or more.

When gold (Au) is contained in a range of 95% by mass or more in the second metal material, the deterioration and erosion resistances can be significantly enhanced.

Preferably, the second metal material additionally contains a glass component. Because of the presences of the glass component, an effect of enhancing a hardness of the conductive segments can be achieved. The glass component includes, for example, borosilicate-lead glass and bismuth oxide glass.

According to the invention, if the effects of the invention are not adversely affected, other metal materials may be added to the second metal material. The other metal materials includes, for example, cobalt (Co), nickel (Ni), ruthenium (Ru), copper (Cu), and platinum (Pt). The other metal materials may be used singly or as a combination of two or more metal materials. The other metal materials are preferably contained in range of 5% by mass or less in the second metal materials.

Now, a method for forming the conductive pattern will be described.

Firstly, powders of the first metal material are mixed with a binder in a solvent to form a paste thereof. The paste is printed on the resistance plate 13 by any means, such as screen printing, and then drying. In this case, the first metal material prepared in the paste form is printed while remaining spaces at locations where the second segments will be formed.

Next, powders of the second metal material are mixed with a binder in a solvent to form a paste thereof. Similarly, the paste is printed on the locations in the resistance plate 13, where the second segments will be formed, by any means, such as screen printing. Then, a dry processing is performed.

Finally, the whole of the resistance plate is sintered, and thus the conductive pattern having the first segments and the second segments arranged therein is formed.

According to the first embodiment of the invention, as described above, gold (Au) separated by an abrasion of the second segments 154 is transferred to sliding surfaces of the first segments 152, such that a sulfide deterioration by a sulfur component, an erosion, an oxidation, and the like can be prevented. Therefore, contact conductivity between the conductive segments 15a and the contact 19 can be better remained, such that a contacting impediment can be prevented. In addition, the separated gold (Au) is also transferred to the contact 19 abraded by sliding, thereby also contributing to the preventing of the contacting impediment. Also, because the first segments 152 is made of the first metal material containing silver (Ag) and palladium (Pd), gold (Au) is not necessary used for the whole of the conductive segments 15a, thereby reducing an amount of used gold relative to that of the related art.

Meanwhile, according to the invention, the conductive segments 16a forming the second conductive pattern 16 may similarly include a plurality of first segments made of a first metal material containing at least silver (Ag) and palladium (Pd), and a plurality of second segments made of a second metal material essentially containing gold (Au). In this case, the deterioration and erosion resistances of the liquid level detecting apparatus may be further enhanced, thereby inhibiting manufacturing costs thereof.

Figure 5A:
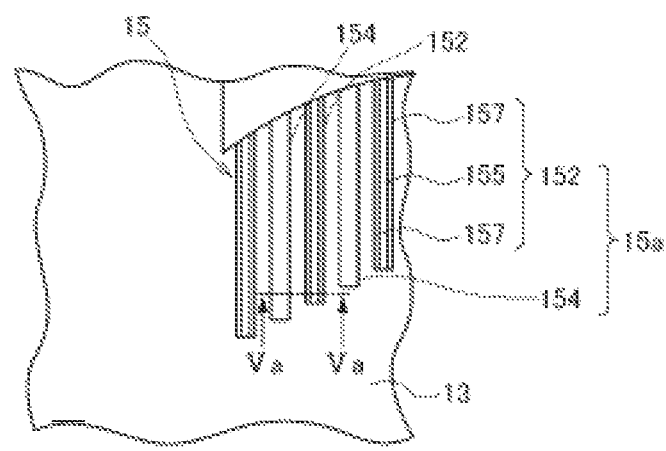
Figure 5B:
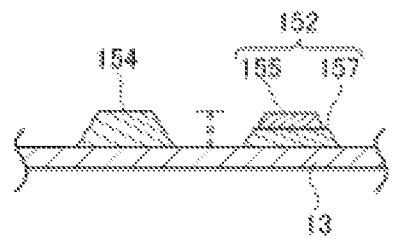

FIGS. 5A and 5B are diagrams illustrating a configuration of conductive segments according to a second embodiment of the liquid level detecting apparatus of the invention, wherein FIG. 5A is a partially enlarged view of the conductive segments, and FIG. 5B is a cross-sectional view taken along a line Va-Va in FIG. 5A.

Similarly, according to the second embodiment of the invention, the plurality of conductive segments 15a forming the first conductive pattern 15 provided on the resistance plate 13 include a plurality of first segments 152 and a plurality of second segments 154. The first segments 152 and the second segments 154 are arranged generally in parallel and alternatively to each other, and form an arc-like shape as a whole (see FIG. 3).

According to the second embodiment, as shown in FIGS. 5A and 5B, the first segments 152 include base portions 157 contacted to the resistance plate 13, and top portions 155 respectively stacked over the base portions 157, when seen in a cross-sectional view perpendicular to a longitudinal direction of the first segments 152. The base portions 157 are made of a first metal material containing at least silver (Ag) and palladium (Pd), and the top portions 155, which can also contact with the contact, are made of a second metal material essentially containing gold (Au).

According to the second embodiment, for the first metal material and the second metal material, the same materials as those of the first metal material and the second metal material according to the first embodiment can be used.

According to a method for forming the conductive pattern of the second embodiment, firstly, powders of the first metal material are mixed with a binder in a solvent to form a paste thereof. The paste is printed on the locations in the resistance plate 13, where the first segments 152 will be formed, by any means, such as screen printing. Then, a dry processing is performed. In this case, the first metal material is printed at an application thickness lower than a height of the first segments 152 when practically completed.

Next, powders of the second metal material are mixed with a binder in a solvent to form a paste thereof. Similarly, the paste is printed over top portions of the first metal material and on the locations, where the second segments 154 will be formed, by any means, such as screen printing. In this case, as shown in FIG. 5B, the second metal material is preferably printed such that the first segments 152 and the second segments 154 each have an identical height a, when seen in the cross-sectional view perpendicular to the longitudinal direction of the first segments 152.

Then, a dry processing is performed, and the whole of the resistance plate is sintered. As a result, the conductive pattern having the first segments and the second segments arranged therein is formed.

According to the second embodiment of the invention, as described above, gold (Au) separated by an abrasion of the second metal material forming the top portions 155 is transferred to sliding surfaces of the conductive segments 15a and the contact 19, such that a sulfide deterioration by a sulfur component, an erosion, an oxidation, and the like can be prevented. Therefore, contact conductivity between the conductive segments 15a and the contact 19 can be better remained, such that a contacting impediment can be prevented. In addition, the separated gold (Au) is also transferred to the contact 19 abraded by sliding, thereby also contributing to the preventing of the contacting impediment. Also, because the base portions 157 are made of the first metal material, a wear resistance of the first segments 152 can be enhanced as a whole. Furthermore, gold (Au) is not necessary used for the whole of the conductive segments 15a, thereby reducing an amount of gold used relative to that of the related art. Meanwhile, because the first segments 152 and the second segments 154 each have the approximately identical height a, a sulfidation resistance and a contacting stability to the contact can be enhanced, thereby sufficiently achieving the above effects.

According to the invention, the contacts 19 and 20 can be made of silver-palladium (AgPd) alloy, silver-copper (AgCu) alloy, silver-nickel (AgNi) alloy, silver-copper-nickel (AgCuNi) alloy, and the like.

The contacts 19, 20 are manufactured by preparing a melted alloy (ingot), forming a bar or a rod from the ingot, wire-drawing the obtained bar or rod by a die, and then heading the obtained wire having a predetermined diameter.

According to the invention, gold (Au) separated by an abrasion of the second segments is also attached to the contacts 19 and 20 abraded by sliding. By such an action, a contacting impediment can be prevented.

Also, because an amount of valuable gold used can be reduced, material costs for each of members can be decreased, thereby inhibiting an increase of the manufacturing costs of the liquid level detecting apparatus.

Meanwhile, the invention is not limited to the above embodiments, but the first segments and the second segments can be arranged in any manner such that a first segment group including at least one first segment and a second segment group including at least one second segment can be alternatively arranged to each other. For example, one row of the second segment may be arranged adjacently to a plurality of rows of the first segments, or a plurality of rows of the second segments may be arranged adjacently to a plurality of rows of the first segments.

What is claimed is:

1. A liquid level detecting apparatus, comprising:
a resistance plate having a plurality of elongated conductive segments arranged therein;
a float configured to be moved upward and downward depending on a displacement of a liquid level to be measured;
a floating arm having one end attached to the float and the other end rotatably supported to be rotated in response to upward and downward movements of the float; and
a contact configured to be slid directly on a sliding surface of the plurality of conductive segments in association with a rotation of the float arm depending on the liquid level,
wherein the plurality of conductive segments comprise a plurality of first segments having the sliding surface made of a first metal material containing at least silver (Ag) and palladium (Pd), and a plurality of second segments having the sliding surface made of a second metal material containing gold (Au), wherein a total composition of the first metal material and a total composition of the second metal material are different from each other, wherein the first segments and the second segments are in parallel and alternate with each other, so that a portion of the gold separated by an abrasion of the sliding surface of the second segments is transferred to the sliding surface of the first segments as the contact slides on the plurality of conductive segments.

2. The liquid level detecting apparatus according to claim 1, wherein the first segments include base portions contacted to the resistance plate, and top portions, which include the sliding surface, respectively stacked over the base portions, and wherein the base portions are made of the first metal material, and the top portions are made of the second metal material.

3. The liquid level detecting apparatus according to claim 1, wherein the second metal material contains gold (Au) in a range of 95% by mass or more.

4. The liquid level detecting apparatus according to claim 1, wherein the second metal material contains a glass component.

5. The liquid level detecting apparatus according to claim 1, wherein the first metal material contains gold (Au).

* * * * *